US008944773B2

(12) United States Patent
Weisse

(10) Patent No.: US 8,944,773 B2
(45) Date of Patent: Feb. 3, 2015

(54) ROTOR BLADE WITH BONDED COVER

(75) Inventor: Michael A. Weisse, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 569 days.

(21) Appl. No.: 13/286,371

(22) Filed: Nov. 1, 2011

(65) Prior Publication Data

US 2013/0108470 A1    May 2, 2013

(51) Int. Cl.

| F01D 5/14 | (2006.01) |
|---|---|
| F04D 29/38 | (2006.01) |
| F01D 5/18 | (2006.01) |
| B63H 1/26 | (2006.01) |
| B63H 7/02 | (2006.01) |
| B23P 15/04 | (2006.01) |
| F04D 29/32 | (2006.01) |

(52) U.S. Cl.
CPC ............. B23P 15/04 (2013.01); F01D 5/147 (2013.01); F04D 29/324 (2013.01); *Y02T 50/672* (2013.01); *Y02T 50/673* (2013.01)
USPC ...................................... 416/229 R; 416/233

(58) Field of Classification Search
CPC ...................................................... F01D 5/147
USPC ................... 416/233, 229 A, 229 R
See application file for complete search history.

(56) References Cited

U.S. PATENT DOCUMENTS

| 3,758,233 | A | | 9/1973 | Cross et al. | |
|---|---|---|---|---|---|
| 5,498,137 | A | * | 3/1996 | El-Aini et al. | ............ 416/229 A |
| 5,626,462 | A | * | 5/1997 | Jackson et al. | ............. 416/97 R |
| 5,725,355 | A | | 3/1998 | Crall et al. | |
| 5,839,882 | A | * | 11/1998 | Finn et al. | ................. 416/229 A |
| 6,039,542 | A | * | 3/2000 | Schilling et al. | ............. 416/233 |
| 6,669,447 | B2 | | 12/2003 | Norris et al. | |
| 6,979,180 | B2 | | 12/2005 | Motherwell | |
| 7,251,888 | B2 | | 8/2007 | Schreiber | |
| 7,565,996 | B2 | | 7/2009 | Das | |
| 2008/0253885 | A1 | * | 10/2008 | Foose et al. | ................ 415/208.2 |
| 2008/0298975 | A1 | * | 12/2008 | James et al. | ............. 416/229 A |
| 2010/0068065 | A1 | * | 3/2010 | Jensen | ..................... 416/241 R |
| 2011/0033308 | A1 | | 2/2011 | Huth et al. | |
| 2011/0211965 | A1 | | 9/2011 | Deal et al. | |

FOREIGN PATENT DOCUMENTS

| CH | 342239 A | 11/1959 |
|---|---|---|
| EP | 1983160 A2 | 10/2008 |
| FR | 2762644 A1 | 10/1998 |
| WO | WO2008092451 | 8/2008 |

OTHER PUBLICATIONS

European Search Report, mailed Feb. 20, 2013.

* cited by examiner

*Primary Examiner* — Dwayne J White
*Assistant Examiner* — Brian P Wolcott
(74) *Attorney, Agent, or Firm* — Kinney & Lange, P.A.

(57) ABSTRACT

An airfoil comprises an airfoil body with an internal cavity and inner and outer covers. The airfoil body defines a first major surface of the airfoil, and a rib extends along the internal cavity. The inner cover is bonded to the airfoil body over the internal cavity, and includes a coupling element extending along the internal cavity in cooperative engagement with the rib. The outer cover is bonded to the airfoil body over the inner cover, and defines a second major surface of the airfoil.

20 Claims, 4 Drawing Sheets

ROTOR BLADE WITH BONDED COVER

BACKGROUND

This invention relates generally to turbomachinery, and specifically to rotor blades for the compressor, turbine or fan section of a gas turbine engine. In particular, the invention concerns a rotor blade with a bonded cover.

Gas turbine engines are typically built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

Turbine engines (or combustion turbines) provide reliable, efficient power for a wide range of applications, including aviation and industrial power generation. Small-scale turbine engines generally utilize a one-spool design, with co-rotating compressor and turbine sections. Larger-scale jet engines and industrial gas turbines (IGTs) are typically arranged into a number of coaxially nested spools, which operate at different pressures and temperatures, and rotate at different speeds.

The individual compressor and turbine sections in each spool are subdivided into a number of stages, which are formed of alternating rows of rotor blade and stator vane airfoils. The airfoils are shaped to turn, accelerate and compress the working fluid flow, and to generate lift for conversion to rotational energy in the turbine.

Gas turbine engines for aviation include turbojet, turbofan, turboprop and turboshaft designs. Turbojets are an older design, in which thrust is generated primarily from the exhaust. In modern applications, fixed-wing aircraft typically employ turbofan and turboprop engines, in which the low pressure spool is coupled to a propulsion fan or propeller. Turboshaft engines are used on rotary-wing aircraft, including helicopters.

In turbofan engines, the fan rotor typically operates as a first stage compressor, or as the pre-compressor stage for a low-pressure compressor or booster module. Fan and compressor blades are thus subject to similar design considerations, and the term compressor blade may encompass both fan and compressor airfoils. Turbine blades also share some of the same basic requirements, including the need for strong, durable and impact-resistant airfoil designs, in lightweight, cost-effective configurations that improve engine performance, increase service life and raise overall operating efficiency.

SUMMARY

This invention concerns a rotor blade or airfoil for the fan, compressor or turbine section of a gas turbine engine. The airfoil is formed from a forging or airfoil body defining a first flow surface (e.g., a concave or pressure surface, or a convex or suction surface), with an internal cavity opposite the flow surface and at least one rib extending along the internal cavity.

A cover with inner and outer sections is bonded to the airfoil body, over the internal cavity. The inner section of the cover includes a coupling element extending along the internal cavity, in mechanical engagement with a cooperating surface on the rib. The outer section of the cover is bonded to the inner section, and defines a second flow surface opposite the first flow surface (e.g., a convex or suction surface, or a concave or pressure surface).

DETAILED DESCRIPTION

Figure 1:
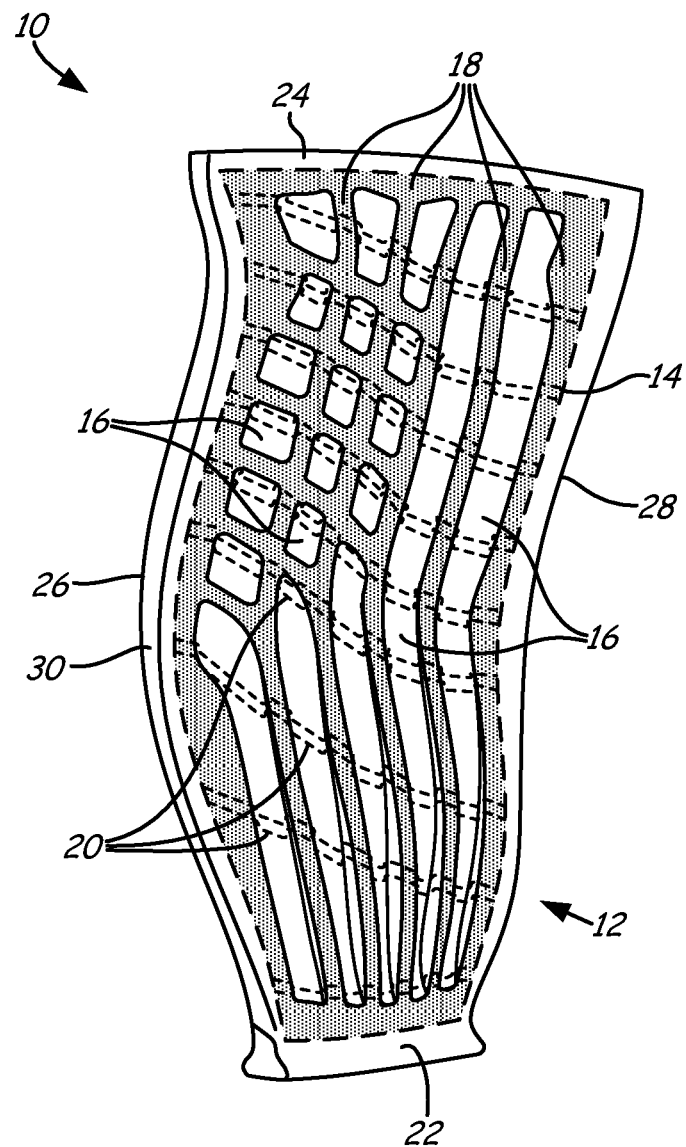
FIG. 1 is a perspective view of an airfoil for a turbine engine.

FIG. 1 is a perspective view of rotor blade or airfoil 10 for a gas turbine engine. Blade 10 includes airfoil body 12 with cover 14 (shown in hidden or dashed lines). Cover 14 is bonded to airfoil body 12 over hollow interior cavity or cavities 16, with interior and exterior ribs or spars 18. Coupling elements 20 extend along the inner surface of cover 14, in mechanical engagement with ribs 18 to increase the coupling strength of cover 14 and reduce shear loading on the adhesive bonds.

Airfoil 10 extends in a radial or spanwise direction from dovetail (or root portion) 22 to blade tip 24, and in an axial or chordwise direction from leading edge 26 to trailing edge 28. The radial direction (r) is defined in a longitudinal sense along the span of airfoil 10, and the axial direction (a) is defined in a transverse sense along the chord of airfoil 10.

In general, a number of internal and external ribs 18 define one or more cavities 16 within airfoil body 12, with individual ribs 18 extending along, between and within individual cavities 16. In one example, airfoil body (or body portion) 12 is formed by forging, and internal cavities 16 are milled or machined between ribs 18 to reduce weight while preserving strength and rigidity. Alternatively, ribs 18 may be provided as one or more separate parts or elements, and attached to airfoil body 12 inside one or more internal cavities 16.

In the particular example of FIG. 1, cover 14 is bonded to airfoil body 12 along the front of blade 10, forming a convex aerodynamic flow surface over internal cavities 16. Alternatively, cover 14 is bonded to the back of airfoil body 12 to form a concave flow surface, or separate covers 14 are used on the front and back. In some designs, sheath 30 is also provided, for example along leading edge 26 or trailing edge 28, or both.

Coupling elements (corrugated structures) 20 couple cover 14 to airfoil body 12 by cooperative engagement with ribs 18, using a combination of mechanical attachment, frictional coupling and adhesion. In particular, coupling elements 20 increase the coupling strength of cover 14 in the radial and axial directions; that is, along the external (flow) surfaces of airfoil 10.

As shown in FIG. 1, coupling elements 20 may couple to ribs 18 along the upper (radially outer) ends, portions or boundaries of cavities 16, reducing shear loading on the coupling adhesive, where the shear loads are generated by centrifugal effects. In addition, coupling elements 20 may couple to ribs 18 along the lower (radially inner) ends, portions or boundaries of cavities 16, or the axially forward or aft ends, portions or boundaries, in order to reduce loading due to blade twist, heating, cooling, fluid flow and other sources of shear, stress and strain on airfoil 10.

Coupling elements 20 also stiffen cover 14 and increase the transverse coupling strength of cover 14; that is, in a direction perpendicular to the flow surfaces. As a result, airfoil 10 is more resistant to impact, including foreign object damage (FOD) and domestic object damage (DOD). Airfoil 10 is also more resistant to stress, strain and fatigue, including vibration and temperature cycling effects generated during takeoff, landing and flight operations, providing increase durability and service life.

Figure 2:
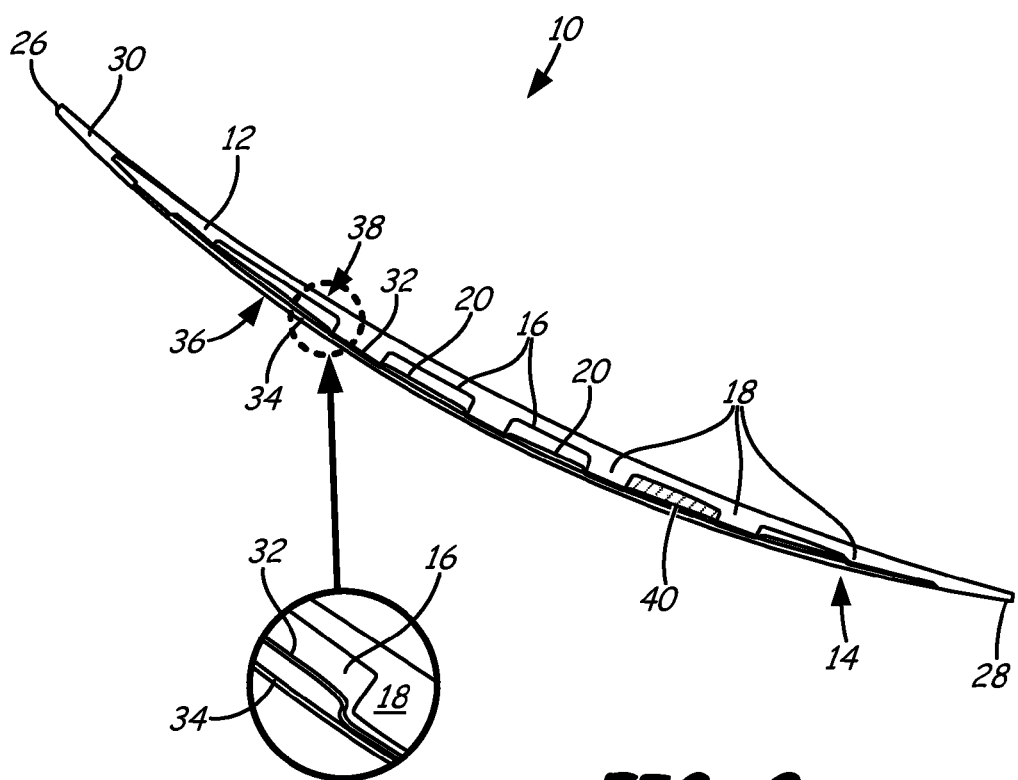
FIG. 2 is a cross-sectional view of the airfoil, showing the cover configuration.

FIG. 2 is a cross-sectional view of airfoil 10, showing cover 14 in a two-component configuration with inner (coupling) section 32 and outer (flow surface) section 34. Inner section 32 of cover 14 is bonded to airfoil body 12 over internal cavities 16, with coupling elements 20 positioned in mechanical engagement with ribs 18. Outer section 34 of cover 14 is bonded to airfoil body 12 over inner section 32.

As shown in FIG. 2, outer cover 14 forms convex flow surface (suction surface) 36 on airfoil 10, and airfoil body 12 forms concave flow surface (pressure surface) 38, opposite convex surface 36. Alternatively, cover 14 is adhered to airfoil body 12 along concave surface 38, or separate covers (or cover assemblies) 14 are provided on both the convex and concave surfaces.

Airfoil body 12 is typically formed of a light, durable metal such as aluminum or titanium, or an alloy thereof. Alternatively, airfoil body 12 is formed of a different metal or metal alloy, for example a cobalt or nickel-based superalloy, or from a durable composite material such as a carbon/polymer or fiber-based material. Cavities 16 may remain hollow, for reduced weight, or filler 40 may be used, for example a lightweight aluminum foam or other lightweight material for increased strength and impact resistance.

Cover 14 is typically formed of materials similar to those of airfoil body 12. In some designs, however, inner and outer covers 32 and 34 are formed of different materials, for example a light, stiff metal for inner cover 32, and a heat and erosion-resistant metal or composite material for outer cover 34. Similarly, sheath 30 is typically formed of a hard, impact-resistant material, for example titanium or titanium alloy.

Figure 3:
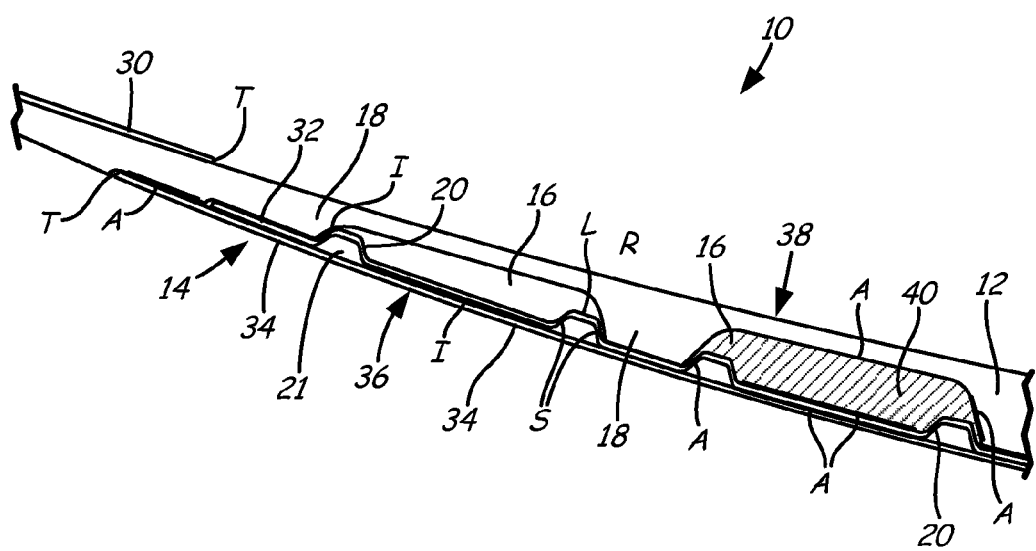
FIG. 3 is an expanded cross-sectional view, showing coupling elements on the inner cover section.

FIG. 3 is an expanded cross-sectional view of airfoil 10, showing inner cover 32 with coupling elements 20 in an alternate configuration. In this design, two coupling elements 20 are provided in each cavity 16, with mechanical and frictional couplings along each individual rib 18. Coupling elements 20 are integrally formed with inner cover 32, for example by stamping from a single-piece sheet of metal, or by machining from a single-piece metal stock.

Corrugated or "stand-up" coupling elements 20 include one or more side sections (or surfaces) S, extending transversely from outer cover 34 to longitudinal section (or surface) L, extending generally parallel to or along outer cover 34. Sides S and longitudinal section L define additional cavities 21 between inner cover 32 and outer cover 34.

As shown in FIG. 3, longitudinal section L of coupling element 20 is typically spaced from the inner surface of airfoil body 12, defining the remainder of internal cavity 16 therebetween. One side S of coupling element 20 is positioned in cooperative engagement with corresponding side R of rib 18, coupling inner section 34 of cover 14 to airfoil body 12 by frictional, mechanical or adhesive contact, or a combination thereof.

Adhesive A (dotted lines) is provided to adhere cover 14 to airfoil 10, for example between airfoil body 12 and inner cover 32, between inner and outer covers 32 and 34, and between airfoil body 12 and outer cover 34. Alternatively, inner cover 32 and outer cover 34 are integrally formed, or attached or bonded together by welding, diffusion bonding or other process, without adhesive A, and cover 14 is adhered to airfoil body 12 as a unit.

Adhesive A can also be applied on or between sides S of coupling elements 20 and mating surfaces R of ribs 18, in order to provide a combination of mechanical, frictional and adhesive coupling strength. Alternatively, some surfaces of airfoil body 12 and cover 14 provide a direct frictional and mechanical coupling at selected interfaces I, without adhesive A. Thus, adhesive A may or may not be present along any particular surface of coupling elements 20, in order to provide cover 14 with a combination of adhesive and direct frictional or mechanical couplings between different coupling elements 20 and ribs 18.

Adhesive A may also be applied between sheath 30 and airfoil body 12, and used to adhere filler 40 to one or both of airfoil body 12 and inner section 32 of cover 14. Along the outer surfaces of airfoil 10, adhesive A is typically shaped before and after drying to create aerodynamically smooth flow surfaces, for example at transitions T between outer section 34 of cover 14 and convex surface 36, and between sheath 30 and concave surface 38.

The composition and material properties of adhesive A thus vary, depending on location and function. Suitable materials include, but are not limited to, one- and two-part glues and adhesives such as thermosetting polymers and polymer/resin epoxies, drying adhesives such as water-based, solvent-based and polymer-dispersion materials, polyurethane adhesives, scrim-supported adhesives, adhesive matrix materials, pressure-sensitive adhesives, and contact-sensitive adhesives.

Figure 4A:
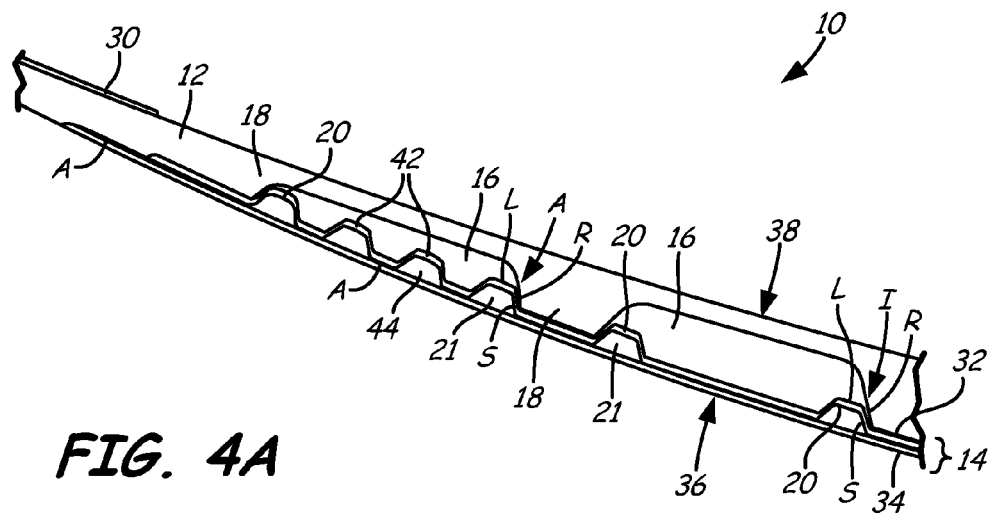
FIG. 4A is a cross-sectional view showing stiffeners on the inner cover section.

FIG. 4A is a cross-sectional view of airfoil 10, with stiffening elements (stiffeners) 42 on inner section 32 of cover 14. In this particular configuration, stiffeners 42 are oriented in a longitudinal or radial direction along inner cover 32; that is, spanwise with respect to airfoil 10.

Figure 4B:
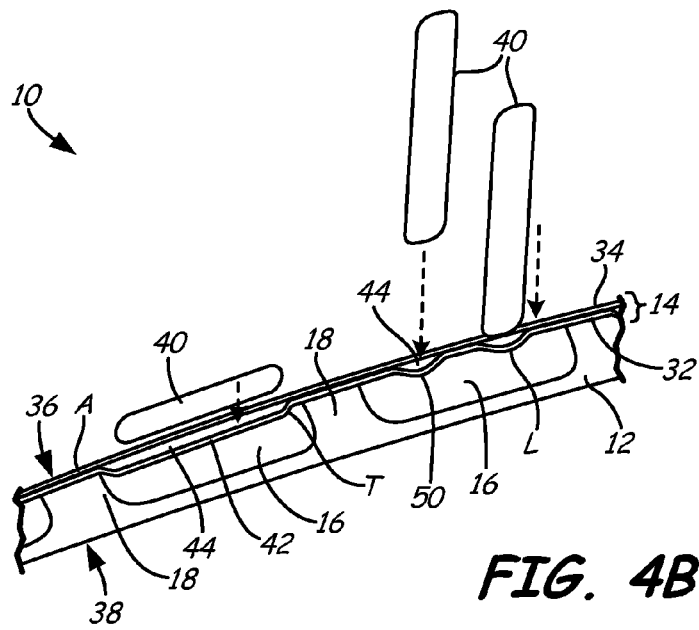
FIG. 4B is a cross-sectional view showing spanwise and chordwise stiffeners on the inner cover section.

FIG. 4B is a cross-sectional view of airfoil 10, with corrugated stiffeners 42 and arcuate stiffeners 50. In this configuration, stiffeners 42 and 50 have trapezoidal and arcuate cross sections, respectively, and may be are oriented in both radial (spanwise) and axial (chordwise) directions with respect to airfoil 10.

As shown in FIGS. 4A and 4B, coupling elements 20 and stiffeners 42 and 50 may be integrally formed with inner cover 32, for example by stamping or machining from a single piece of sheet metal or metal stock. Alternatively, one or both of coupling elements 20 and stiffeners 42 and 50 may be separately formed, and then attached to inner cover 32.

In addition, coupling elements 20 and stiffeners 42 and 50 can be formed as a number of separate or discrete structures within cavities 16, spaced from one another in a spanwise or chordwise direction. Alternatively, coupling elements 20 and stiffeners 42 can be formed as integral or continuous structures, extending across cavity 16 and between ribs 18 in either the spanwise or chordwise direction.

Typically, each coupling element 20 is positioned adjacent at least one rib 18, in order to form a mechanical coupling between side S and mating surface R. Stiffeners 42 and 50, on the other hand, may be spaced from each rib 18 in both radial (spanwise) and axial (chordwise) directions. Additional filler material 40 may also be provided in stiffener cavities 44, as defined between stiffeners 42 and 50 and outer cover section 34. Filler 40 can be a high stiffness to weight material such as fiber reinforced composite, or a softer material with vibration dampening properties.

Coupling elements 20 and stiffeners 42 and 50 are also configured with a combination of different transverse sides S and longitudinal sections L, in order to reduce stress and strain concentrations across inner cover 32, and to reduce shear loading on adhesive A during operation of airfoil 10. In combination with adhesive A, coupling elements 20 and stiffeners 42 and 50 also balance mechanical, frictional and adhesive loading on cover 14 and airfoil body 12, and absorb vibration energy to damp vibration amplitudes across a range of different modes and frequencies.

Figure 5:
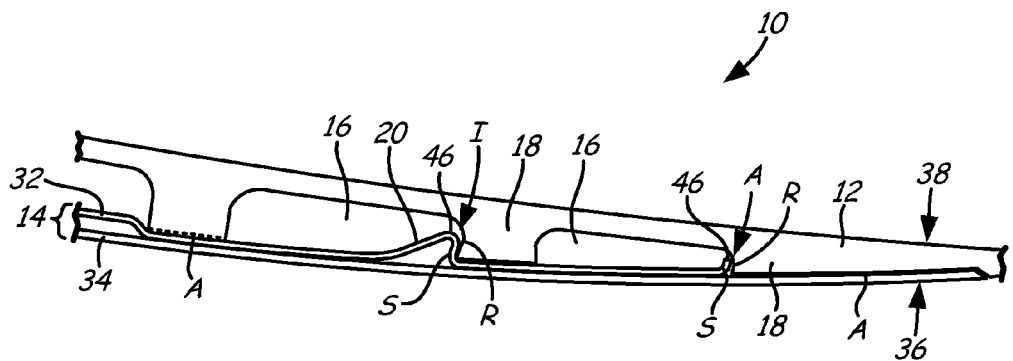
FIG. 5 is a cross-sectional view showing retention features of the coupling elements.

FIG. 5 is a cross-sectional view of airfoil 10, showing retention features (retainers) 46 on inner section 32 of cover 14. Retainers 46 are formed along sides S of coupling elements 20, and cooperate with mating surfaces R of ribs 18 to provide additional mechanical retention of cover 14 against airfoil body 12.

As shown in FIGS. 4A, 4B and 5, ribs 18 have a variety of different shapes and configurations along mating surfaces R, in order to cooperate with different mating surfaces S on coupling elements 20. In particular, mating surfaces R of ribs 18 and sides S of coupling elements 20 can be oriented transversely or substantially perpendicular to flow surfaces 36 and 38 of airfoil 10, or with an inward or outward taper. Thus coupling features 20 and stiffeners 42 and 50 have a variety of corrugated, curved and sawtooth configurations, with substantially trapezoidal, triangular and arcuate cross sections.

For an inward taper, the cross section of cavity 16 decreases toward inner cover 32, as shown in FIG. 5. In addition, retainer 46 includes a hook, clip or catch structure that overlaps with the inward taper on corresponding surface R on rib 18 to provide mechanical retention for cover 14, without or without adhesive A. That is, side S of retainer 46 cooperates with mating surface R of rib 18 to hold cover 14 in place along flow surface 36, reducing both shear stress and tensile stress loads on adhesive A.

This contrasts with an outward taper design for sides R of ribs 18, in which the cross section of cavity 16 increases toward inner cover 32 (see, e.g., FIG. 4A). In a perpendicular or transverse configuration, the cross section of cavity 16 is substantially constant (FIG. 4B). In these designs, the coupling between inner cover 32 and airfoil body 12 is substantially frictional along side S of coupling element 20 and cooperating surface R of rib 18, providing shear stress relief for adhesive A, with or without additional tensile stress relief.

While this invention has been described with reference to exemplary embodiments, it will be understood by those skilled in the art that various changes may be made and equivalents may be substituted for elements thereof without departing from the spirit and scope of the invention. In addition, modifications may be made to adapt a particular situation or material to the teachings of the invention, without departing from the essential scope thereof. Therefore, the invention is not limited to the particular embodiments disclosed herein, but includes all embodiments falling within the scope of the appended claims.

The invention claimed is:

1. An airfoil comprising:
   an airfoil body defining a first major surface of the airfoil;
   a first internal cavity in the airfoil body, opposite the first major surface;
   a second internal cavity in the airfoil body, opposite the first major surface;
   a rib extending along and between the first and second internal cavities;
   an inner cover bonded to the airfoil body over only a portion of the first and second internal cavities, the inner cover comprising a first coupling element extending along the first internal cavity in cooperative engagement with the rib; and
   an outer cover bonded to the airfoil body over the inner cover and positioned over the first and second cavities, the outer cover defining a second major surface of the airfoil.

2. The airfoil of claim 1, further comprising adhesive for bonding the inner cover to the airfoil body and for bonding the outer cover to the inner cover.

3. The airfoil of claim 2, wherein the first coupling element provides shear stress relief for the adhesive during operation of the airfoil.

4. The airfoil of claim 1, wherein the inner cover comprises a corrugated stiffener spaced from the rib along the first internal cavity.

5. The airfoil of claim 1, wherein the first coupling element is formed of a sheet, the sheet comprising:
   a side section extending transversely to the inner cover;
   a bend connected to the side section; and
   a lateral section connected to the bend and extending along the inner cover;
   wherein the side section in cooperative engagement with a corresponding side of the rib.

6. The airfoil of claim 1, wherein the first coupling element comprises a retainer forming a mechanical coupling in cooperative engagement with an inwardly tapered side of the rib.

7. The airfoil of claim 1, wherein the airfoil body defines a concave surface of the airfoil and the outer cover defines a convex surface of the airfoil.

8. The airfoil of claim 1, wherein the outer cover extends over an entirety of the first internal cavity and an entirety of the second internal cavity.

9. The airfoil of claim 1, and further comprising:
   a second coupling element extending along the second internal cavity in cooperative engagement with the rib.

10. A blade comprising:
    an airfoil body defining a first flow surface, the airfoil body comprising a first cavity formed opposite the first flow surface, a second cavity formed opposite the first flow surface, and a rib extending along and between the first and second cavities;
    an inner cover bonded to the airfoil body over only a portion of the first and second cavities, the inner cover having a coupling element with a side section extending transversely to the inner cover, the side section engaged with a corresponding side of the rib; and
    an outer cover bonded to the airfoil body over the inner cover and positioned over the first and second cavities, the outer cover defining a second flow surface opposite the first flow surface.

11. The blade of claim 10, further comprising adhesive bonds between the inner cover and the airfoil body and between the outer cover and the inner cover.

12. The blade of claim 11, wherein the coupling element reduces shear stress on the adhesive bonds in operation of the rotor blade.

13. The blade of claim 10, wherein the inner cover comprises a corrugated stiffener spaced from the rib along the first cavity.

14. The blade of claim 10, wherein the first flow surface comprises a pressure surface and the second flow surface comprises a suction surface.

15. The blade of claim 10, wherein the coupling element is formed of a sheet, the sheet comprising:
    a side section extending transversely to the inner cover;
    a bend connected to the side section; and a lateral section connected to the bend and extending along the inner cover;

wherein the side section in cooperative engagement with a corresponding side of the rib.

16. A rotor blade comprising:

a forging defined along a first major surface of the rotor blade;

ribs formed in the forging, the ribs defining a plurality of internal cavities therebetween;

an inner cover adhered to the forging over only a portion of the plurality of internal cavities, the inner cover having retention elements extending along the internal cavities in mechanical engagement with the ribs; and an outer cover adhered to the forging over the inner cover and positioned over the first and second cavities, the outer cover defining a second major surface of the rotor blade, opposite the first major surface of the rotor blade.

17. The rotor blade of claim 16, wherein the retention elements each comprise:

a side section extending transversely to the inner cover;

a bend connected to the side section; and a lateral section connected to the bend and extending along the inner cover;

wherein the side section in cooperative engagement with a corresponding side of one of the ribs.

18. The rotor blade of claim 16, wherein the retention elements comprise hook or catch features mechanically coupled to the ribs.

19. The rotor blade of claim 16, wherein the inner cover comprises corrugated stiffening features spaced from the ribs along the plurality of internal cavities.

20. The rotor blade of claim 16, wherein the inner cover comprises stiffeners having side surfaces transverse to the inner cover, the side surfaces spaced from the ribs along the plurality of internal cavities.

* * * * *